United States Patent [19] [11] 3,929,673
Hoffmann et al. [45] Dec. 30, 1975

[54] METHOD OF PRODUCING A RANEY COPPER CATALYST AND THE CATALYST SO MADE

[75] Inventors: Karl H. Hoffmann, Brookfield; Donald R. Anderson, Oswego, both of Ill.; Ronald J. Allain, Brookhaven, Miss.

[73] Assignee: Nalco Chemical Company, Chicago, Ill.

[22] Filed: June 28, 1974

[21] Appl. No.: 484,179

[52] U.S. Cl. ............. 252/463; 252/476; 260/561 N
[51] Int. Cl.² ..................... B01J 21/04; B01J 23/72
[58] Field of Search ............... 252/463, 476, 477 Q; 260/561 N

[56] References Cited
UNITED STATES PATENTS

| | | | |
|---|---|---|---|
| 3,379,635 | 4/1968 | Von Doehren et al. | 252/477 Q |
| 3,766,088 | 10/1973 | Yoshimura et al. | 260/561 N |
| 3,767,706 | 10/1973 | Habermann et al. | 260/561 N |

*Primary Examiner*—W. J. Shine
*Attorney, Agent, or Firm*—Hill, Gross, Simpson, Van Santen, Steadman, Chiara & Simpson

[57] ABSTRACT

An improved technique for making a Raney copper catalyst by contacting particulate copper/aluminum alloy particles with an aqueous solution containing dissolved therein both alkali metal hydroxide and at least one aliphatic polyhydric alcohol containing at least two carbon atoms per molecule.

32 Claims, No Drawings

METHOD OF PRODUCING A RANEY COPPER CATALYST AND THE CATALYST SO MADE

BACKGROUND OF THE INVENTION

Raney copper catalysts are conventionally prepared by contacting a starting copper aluminum alloy in particulate form with aqueous alkali metal hydroxide to remove some portion of the aluminum present initially. The manner in which such contacting is conducted affects the properties of the resulting Raney copper catalyst in such reactions, for example, as the hydrolysis of acrylonitrile to acrylamide under aqueous liquid phase conditions conducted in the presence of such catalyst.

Apparently, Raney copper catalysts have heretofore always been prepared with attention being given primarily to aluminum removal. Apparently complete aluminum removal was heretofore sometimes believed to have been achieved and to be desirable for purposes of enhancing catalyst activity for this nitrile hydrolysis reaction; see, for example, Canadian Pat. No. 899,380, at p. 5 where the Kawaken Fine Chemicals Co. Raney copper catalyst is used. According to Kawaken Fine Chemicals Co. trade literature, it appears that substantially complete aluminum removal is achieved in such catalyst.

The art theorizes that Raney catalysts can contain amounts of insoluble aluminates which are sufficient to adversely affect catalyst activity and life for whatever reason, and the art has described processing procedures alleged to remove such impurities; see for examples, U.S. Pat. Nos. 2,673,189; 2,604,455; 2,950,260; and British Pat. Nos. 642,861 and 658,863.

It has heretofore been proposed to activate Raney alloys for use as fuel cell electrodes by using in the activating solution alkali metal tartrates or polycarboxylated aliphatic amino compounds; see U.S. Pat. No. 3,235,513. See also U.S. Pat. No. 3,067,276 for a discussion of catalyst regeneration using citric acid.

Because of the limitations and shortcomings observed for prior art Raney copper catalysts as respects catalyst initial activity and catalyst life, the art continues to seek improved Raney copper catalysts such as will be particularly suitable for use in such a nitrile hydrolysis reaction operated, for example, at rapid conversion rates and high conversion levels using a concentrated acrylonitrile/water feed.

So far as is known, no one has ever heretofore used or suggested the use of aliphatic polyhydric alcohols in preparing a Raney copper catalyst with aqueous alkali metal hydroxide.

BRIEF SUMMARY OF THE INVENTION

The present invention is directed to an improved process for preparing a Raney copper catalyst and to the resulting catalyst so prepared. The process involves contacting at a temperature below about 80°C particles of a metal alloy comprised of copper and aluminum with an aqueous solution of which has dissolved therein on a 100 weight percent total by-product free solution basis (from greater than 0 to about 25 weight percent alkali metal hydroxide and from greater than 0 up to about 25 weight percent, or the solubility limit thereof in water, whichever one thereof is lower, of at least one aliphatic polyhydric alcohol compound containing at least two carbon atoms). A more preferred aliphatic polyhydric alcohol compound for use in this invention contains at least three carbon atoms per molecule and at least three hydroxyl groups per molecule which are attached to at least three different carbon atoms. Such an alcohol typically contains less than 9 carbon atoms per molecule. One preferred class of such aliphatic polyhydric alcohols is represented by the formula:

(1) $H - (CHOH)_n - H$ where $n$ is the integer of from 4 through 8 inclusive. More preferred compounds of formula 1 are those where $n$ is 5 or 6 and a most preferred class of compounds of formula 1 are those where $n$ is 6.

Preferred such alcohols have a solubility in water of at least about 5 weight percent. Generally such alcohols have a molecular weight less than about 1000, and preferably less than about 500, and when repeating or condensed molecules are combined into a single molecule, no more than a dimer or trimer is used.

The catalyst so prepared characteristically and typically comprises from about 2 to 45 weight percent aluminum with the balance up to 100 weight percent being copper in any given catalyst. Minor quantities of other materials, such as oxygen, may be present. More preferably, such catalyst comprises, on a 100 weight percent total weight basis, from about 10 to 35 weight percent aluminum with the balance up to 100 weight percent thereof being copper. This catalyst characteristically and typically has an average particle size (diameter) in the range from about 0.001 to 0.5 inch, though larger and smaller particle sizes may be used if desired.

Because of the characteristically high initial catalytic activity, and also the characteristically long catalyst activity life, associated with the type of catalyst so prepared by the process of this invention, the present invention provides an improved catalyst which can be used under conditions of continuous and extended use to produce desired, economically significant, high conversion yields of a product, such as acrylamide from acrylonitrile by hydrolysis.

In addition, the process of this invention offers operating efficiencies and economies, particularly in fixed catalyst bed reactors adapted for continuous operation, which are believed to be greater than heretofore known in the art of Raney copper catalysts.

Other and further aims, objects, purposes, advantages, utilities, and features will be apparent to those skilled in the art from a reading of the present specification.

DETAILED DESCRIPTION

The catalyst of the present invention is a Raney copper catalyst which has been activated through contact with an aqueous composition containing therein dissolved alkali metal hydroxide and dissolved aliphatic polyhydric alcohol. The starting material is a preformed binary metal alloy comprised of aluminum and copper in particulate form which contains a weight ratio of Al/Cu in the range from about 70:30 to 30:70 (preferably about 45:55 to 55:45, and most preferably about 50:50). Minor quantities of other materials, such as metals or oxygen, may be present in a starting alloy.

In general, no particular special conditions need be employed when contacting starting alloy particles with an aqueous solution of alkali metal hydroxide and aliphatic polyhydric alcohol. Typically, the alloy starting material is, as indicated, in the form of particles ranging in size from about 0.001 to 0.5 inch. Preferably, this solution comprises from greater than 0 to about 5 weight percent aliphatic polyhydric alcohol, from greater than 0 to about 15 weight percent alkali metal hydroxide, and with the balance up to 100 weight percent thereof being water (total byproduct free composition basis). More preferably, such a solution comprises from greater than 0 to about 5 percent alkali metal hydroxide, from about 0.01 to about 1.0 weight percent aliphatic polyhydric alcohol and with the balance up to 100 weight percent thereof, total byproduct free (aluminum-free) composition basis, being water, though some aluminate may be present with other byproducts. Preferably, the process of contacting with such a solution is conducted while maintaining the reaction zone in the region of the particles being activated into Raney copper catalyst at a temperature in the range of from about 0° to 80°C. Preferably, the contacting time ranges from about one-half to 30 hours, though longer and shorter times may be employed, if desired, as those skilled in the art will appreciate. More preferably, the contacting temperature is in the range of from about 30° to 60°C. More preferably, the contacting time is adjusted to be in the range of from about 4 to 12 hours.

The exact amount of polyhydric alcohol used in a given catalyst activation performed in accordance with the teachings of this invention can vary over relatively wide ranges, as indicated. When a catalyst activation procedure using a particular polyhydric alcohol is being optimized so as to produce, for example, a catalyst having maximized initial activity, it can be borne in mind that apparently each additive has its own particular optimized concentration level above which further increases thereof may result in no substantial further increase in product activated calayst activity, as data presently available suggests. Indeed, at relatively high concentrations, at least some polyhydric alcohols may cause side reactions or other (presently unknown) effects to occur which exert an adverse influence upon a given activation procedure. Thus, as those skilled in the art will appreciate, it is practically impossible to express for each polyhydric alcohol a broad useable range or an optimized use range. In general, lower, as opposed to higher, concentrations of an additive material are preferred for reasons of economy and general effectiveness in commercial activation procedures using preferred polyhydric alcohol.

A Raney copper catalyst preferably should have at least about 25 weight percent of the initially present aluminum in such alloy particles removed during alkali contacting; however, it is apparently not necessary to remove aluminum from a catalyst during activation thereof by contacting such with a mixed solution of alkali metal hydroxide and aliphatic polyhydric alcohol as taught by this invention.

In one preferred and exemplary plant operational mode of catalyst preparation, activation of such starting alloy is accomplished by first contacting an aqueous solution of at least one aliphatic polyhydric alcohol with a group of such alloy particles. This aqueous solution can contain dissolved therein from about 0.01 to 1.0 weight percent of aliphatic polyhydric alcohol (total solution basis). Conveniently, the particles are preferably initially immersed in water and the aliphatic polyhydric alcohol(s) is (are) added to such water of immersion until the desired concentration of such compound(s) is (are) obtained. Such alloy particle group has an average particle size (diameter) in the range from about 0.001 to 0.5 inch, and such copper alloy preferably has a copper to aluminum weight ratio of from about 45:55 to 55:45. This aqueous solution has a temperature in the range from about 30° to 60°C during contacting. The time of such first contacting is relatively unimportant though times of from about 5 minutes up to several hours have been found to be convenient.

Secondly, one contacts the resulting said group of alloy particles with an aqueous caustic (alkali metal hydroxide) solution. Conveniently, the caustic (alkali metal hydroxide) is added to (and dissolved in) the previously utilized solution of aliphatic polyhydric alcohol while continuous contact of such solution with such particles is maintained. Such second contacting is accomplished over a total time interval of from about one-half to 30 hours, and such caustic solution is added gradually to said group over said time interval. The contact rate or addition rate of starting caustic solution being added to said group of particles during such contacting typically ranges from about 0.01 to 10 pounds caustic per pound of said starting group of alloy particles per hour. The total quantity of caustic so added to the aqueous medium in the reaction zone is typically in the range of from about 0.5 to 25 pounds of caustic per pound of said group of particles (dry weight basis). During such contacting, such aqueous caustic solution and the resulting aqueous medium produced in such contacting each have a temperature in the range from about 0° to 80°C. During such second contacting, said group of particles is thus maintained in contact with at least one aliphatic polyhydric alcohol. Preferably, at least about 25 weight percent (total starting weight basis) of this aluminum initially present is removed during such a contacting operation conducted in accord with the teachings of this invention during the course of such an initial catalyst operation using fresh starting alloy particles.

While some alkali metal hydroxide during the contacting characteristically reacts with the aluminum of the alloy particles, the manner in which an aliphatic polyhydric alcohol functions in the practice of the present invention is presently unknown. One theory (and there is no intent herein to be bound by theory) is that an aliphatic polyhydric alcohol functions as a sequestering or stabilizing agent which prevents the precipitation of solid particles of alumina (or derivatives) on the surface or in the pores of the catalyst, a theory which may be supported by U.S. Pat. No. 2,345,134 where polyhydroxylated compounds apparently act as stabilizing agents for sodium aluminate. Particles previously contacted with an alkali metal hydroxide solution may advantageously be post-contacted with an aqueous solution of aliphatic hydroxylated hydrocarbon compound using concentrations as taught herein.

After such second contacting, the resulting group of Raney copper catalyst particles is preferably washed to separate therefrom remaining aliphatic polyhydric alcohol, remaining unreacted caustic, and aluminate. Thereafter, the so-washed group of particles may optionally interveningly be stored before being used in a subsequent catalytic process.

For example, such a subsequent catalytic process can be a hydrolysis process which preferably involves contacting such particles of Raney copper catalyst with an aqueous composition comprising, for example, from about 30 to 40 weight percent acrylonitrile with the remainder to 100 weight percent thereof being water while maintaining a temperature of, for example, from about 70° to 125°C, as indicated.

Examples of suitable aliphatic polyhydric alcohols include sorbitol, mannitol, pentaerythritol, and the like. Most preferred compounds of formula 1 are sorbitol and mannitol.

Those skilled in the art will readily appreciate that any convenient procedure or technique may be employed for contacting starting copper/aluminum alloy particles with an aqueous mixture of alkali metal hydroxide and aliphatic polyhydric alcohol. The starting alloy particles can be added to a starting mixture composition, or vice versa, or otherwise as desired. While pretreatment of particles of alloy with a starting mixture comprising an aqueous solution of aliphatic polyhydric alcohol is more convenient, such is not necessary. A preformed Raney copper catalyst conventionally prepared by alkali contact can be post-treated, if desired, with a starting solution comprised of alkali metal hydroxide and aliphatic polyhydric alcohol in accord with the teachings of this invention, particularly when optimized catalyst performance is not needed. It is preferred to activate a catalyst as taught herein for use in this invention under conditions such that the metal particles are subjected to a minimum of heat exposure, such as is generated when, for example, concentrated aqueous alkali metal hydroxide contacts the starting alloy particles. It is preferred to activate a catalyst as taught herein for use in this invention using temperatures which do not exceed about 80°C and by using controlled incremental or continuous addition of alkali metal hydroxide over an extended time period to an aqueous medium being used to achieve a group of particles.

In the practice of this invention, activation of a Raney copper catalyst may be accomplished using very dilute aqueous solutions of alkali metal hydroxide. Even trace amounts of alkali metal hydroxide have been found to be effective for activation, as have trace amounts of aliphatic polyhydric alcohol. In general, it is preferred to practice this invention using small amounts (e.g. less than about 10 weight percent total solution basis) of, respectively, alkali metal hydroxide and aliphatic polyhydric alcohol.

Typically, one can employ during catalyst activation a total quantity of aqueous hydroxide such that the molar quantity of hydroxide used totals from about 0.25 to 2.0 times (preferably 1.1 to 2.0 times) the total molar amount of aluminum initially present in a starting group of alloy particles, as when a batch preparation procedure is being employed, where the aqueous hydroxide is being added to a vessel containing a fixed quantity of starting alloy with aqueous aliphatic polyhydric alcohol and the aqueous hydroxide leaching composition being allowed to accumulate in this vessel during the leaching operation.

The amount of hydrogen gas evolved during an activation or a contacting in accord with this invention is not always related to, or correlated with, the amount of alkali metal hydroxide actually used.

During the contacting of starting alloy with such a leaching composition, an aluminate (in solution) and hydrogen gas are characteristically produced. Conveniently, the hydrogen gas is vented more or less at the rate generated from the reaction zone, and most of the aluminate may be removed in the water of the leaching composition, if desired. It is preferred to conduct the activation operation under inert conditions, such as under a blanket of nitrogen gas or a gas of the helium family, primarily to avoid forming explosive mixtures of hydrogen and oxygen.

At the end of a contacting operation by the teachings of this invention, the resulting solid catalyst particles remaining are preferably washed with water preferably to a neutral pH (e.g. a pH in the range of from about 7.0 to 7.5). The product catalyst is then removed from the reaction zone, and wet screened to separate fines, preferably.

The product catalyst is conveniently stored under water, as in drums, prior to charging to a reactor for use in the practice of the process of the present invention. Keeping the catalyst under water prevents oxidation by air which occurs rapidly if the catalyst is allowed to have oxygen exposure.

When practicing the process of the present invention to make a Raney copper catalyst for use in a suspension reactor bed system, it is preferred to employ the Raney copper catalyst in the form of particles at least 90 weight percent of which are in an average size range from about 0.002 to 0.100 inch. Similarly, when the present invention is used to make a Raney copper catalyst for use in a fixed bed system, it is convenient and preferred to use the Raney copper catalyst in the form of particles at least 90 weight percent of which range in average size from about 0.02 to 0.50 inch.

In one more preferred catalyst preparation procedure, using the preferred route above described, the said group of alloy particles is confined to a reaction zone. A caustic solution and a solution of aliphatic polyhydric alcohol may be admixed and contacted with said group of particles in said zone, but the resulting aqueous medium is gradually removed from the zone during the contacting. In another more preferred catalyst preparation procedure, using the preferred route above described, the said resulting aqueous medium is so removed at a volumetric rate which is about equal to the rate of addition of said caustic solution. In such a removal procedure, substantially 100 weight percent of this so-removed resulting aqueous medium can be recycled back into contact with the group of particles being activated. During such a recycle, the so-recycled aqueous medium is admixed with at least a portion of fresh caustic solution before or during recycle contact with such a group of particles.

Alternatively, less than 100 weight percent of said so-removed resulting aqueous medium can be recycled back into contact with said group of particles. The balance up to 100 weight percent thereof is permanently removed from said reaction zone and can be discarded. Caustic may be added to such reaction zone at a rate approximately equal to the rate at which caustic is consumed through reaction with the aluminum in the alloy. The contacting process involving caustic addition may preferably be practiced continuously at a rate which is approximately equal to the rate of caustic consumption. The amount of aluminum left in the catalyst after an activation, as described herein, can vary widely, but in the case of an active catalyst used for fixed bed catalysts, it has been found that as much as 20 weight percent aluminum (based on total catalyst weight) can be present in a catalyst without apparently affecting catalyst use and performance characteristics, such as conversion rate, throughput rate of reactants, catalyst life, catalyst activity, etc., a fact which is somewhat surprising in view of the prior art above reviewed. Aliphatic polyhydric alcohol can be added with caustic.

In preparing a catalyst of this invention, it will be appreciated that there apparently is a sensitive relationship between the temperature of activation and the time of caustic contact with starting alloy. In general, the higher the temperature, the longer should be the time for caustic addition to provide a most active catalyst, because under such conditions localized overheating of the catalyst particles is avoided or reduced to a minimum level. Localized overheating of alloy particles may interfere with generation of a catalyst having an optimum desired group of characteristics associated therewith. If one employs a rapid reaction between alloy particles and alkali, there tends to be produced a lessening of catalyst activity. A surprising amount of heat is liberated when one contacts alloy particles with caustic so that on a large scale of catalyst activation, refrigeration equipment could be used to remove the exotherm.

As used herein, the term "gradual" includes not only continuous conditions, but also intermittent addition of alkali to alloy particles or removal of a resulting aqueous medium from the zone of a given activation reaction.

Even after a great portion of removable aluminum in particles has been etched away by caustic, as in a conventional Raney copper catalyst activation procedure, one can still obtain a benefit (improved catalyst activity in the hydrolysis process of this invention) by contacting such particles with a solution of alkali metal hydroxide and aliphatic polyhydric alcohol in accord with the teachings of this invention. Hence, a starting alloy material in particulate form for purposes of this invention can be one which has previously undergone a contacting with alkali metal hydroxide using, for example, prior art Raney copper catalyst activation technology. The beneficial results achieved by a contacting conducted in accord with the invention are characteristically producible even when using an aqueous treating or contacting medium wherein the concentration of alkali metal hydroxide and aliphatic polyhydric alcohol, respectively, is very low. Though, as those skilled in the art will appreciate, one can employ, as taught herein, relatively high such concentrations, low such concentrations are preferred during a contacting operation as taught herein. Mixture of different ones of the additives taught herein may sometimes be advantageously employed during contacting.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

Example 1 (parts a through h)

A series of eight different Raney copper catalysts are prepared using the following standardized procedure.

A three-liter reaction flask is provided with a nitrogen purge inlet, a buret for caustic addition, a thermometer, and a hydrogen outlet connected to a wet test meter. A basket is attached to a motor-driven agitator shaft so that the basket can be rotated inside the reaction flask during the activation procedure.

A total of 200 grams of a copper/aluminum alloy particles are placed inside of the basket. The particles are between 6 and 8 Tyler mesh in size, and they are approximately 50% aluminum and 50% copper on a weight percentage basis. A total of approximately 2650 grams of deionized water and a preselected amount of an organic additive (aliphatic polyhydric alcohol) are charged to the flask. The flask is subsequently closed and purged with nitrogen to prevent forming an explosive gas mixture during activation. A total of 662 grams of a 50% by weight solution of sodium hydroxide in water are added to the flask incrementally over approximately a 4-hour period. After completing the sodium hydroxide addition, the mixture is held for an additional time period sufficient to allow a total of 4.2 to 4.7 cubic feet of hydrogen to evolve from the flask, as measured by the wet test meter. During the sodium hydroxide addition and the subsequent hold period the temperature of the liquid is maintained between 40° and 43°C. The basket containing the metal particles is rotated inside the liquid during the sodium hydroxide addition and subsequent hold period. After completing the activation procedure, the resulting Raney copper catalyst particles are washed repeatedly with water until the washings show a pH which is less than 8. Fines are removed by wet screening on a 10 Tyler mesh screen and subsequently are stored under water prior to testing for acrylonitrile hydration activity.

A total of 5 different organic additives are here individually tested. The additives tested are (a) sorbitol, (b) mannitol, (c) pentaerythritol, (d) glycerol, and (e) ethylene glycol. In parts (f) and (g), sorbitol is retested at higher concentration levels. A blank or control catalyst test (designated (h)) is run in which no additive is added to the catalyst preparation reaction vessel. Results appear in Table I.

Example 2 (parts a through h)

The 8 catalysts (7 with additives) prepared in Example 1 are each tested for acrylonitrile hydration activity by using the following standardized procedure.

A total of 80.6 grams of wet catalyst are charged to a reaction tube which has been fabricated from ¾ inch diameter pipe. The reaction tube is immersed in a hot water bath which is used to control temperature inside the tube, as measured by thermocouples which are enclosed inside a thermowell which projects into the reaction tube from one end.

When this reactor is used to determine activity of a catalyst, acrylonitrile and water are separately pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmosphere. Product is collected and analyzed by gas chromatography for weight percent acrylamide, acrylonitrile, and water. From this analysis, the percent conversion of acrylonitrile to acrylamide is estimated.

For each catalyst, a series of different tests are run at different contact times with all other variables held constant, as follows:

1. Arithmetic mean catalyst bed temperature of approximately 175°F.
2. Feed composition 100% basis of 25 weight % acrylonitrile and 75 weight % water.

Contact time is inversely measured as weight hourly space velocity (WHSV), which is defined as weight hourly feed rate divided by dry catalyst weight in the reaction zone.

The contact times are varied to bracket a 35% conversion of acrylonitrile to acrylamide. The WHSV required for a 35% conversion is estimated by graphical or statistical interpolation. The catalyst activity (a) is then calculated from the following expression:

$$a = 1.2 \, (WHSV_{35})$$

where $WHSV_{35}$ is the weight hourly space velocity required for 35% conversion of acrylonitrile to acrylamide.

The activities determined by the preceding procedure for the catalysts prepared in Example 1 are tabulated in Table I.

TABLE I

| Additive | Additive Concentration in Solution* (% by wt.) | Additive Level (% based on alloy charge) | Catalyst Activity |
|---|---|---|---|
| (a) sorbitol | 0.15 | 2.5 | 8.4 |
| (b) mannitol | 0.15 | 2.5 | —** |
| (c) pentaerythritol | 0.15 | 2.5 | 4.4 |
| (d) glycerol | 0.15 | 2.5 | 3.6 |
| (e) ethylene glycol | 9.6 | 175 | 4.5 |
| (f) sorbitol | 4.3 | 75 | 8.3 to 11.2 |
| (g) sorbitol | .45 | 7.5 | 10.0 |
| (h) blank-no additive | 0 | 0 | 3.2 |

*after NaOH addition is complete, on an aluminate-free basis
**Dash marks indicate that though particular product catalyst was prepared with indicated additive, the particular product catalyst was not evaluated to determine catalyst activity as respects conversion of acrylonitrile to acrylamide.

Example 3

A catalyst first is prepared in the same manner as described in Example 1 but without adding any additive to the reaction flask prior to or during the sodium hydroxide addition period.

Then this catalyst is treated as follows: A clean reaction flask as described and equipped in Example 1 is filled with approximately 2650 grams of deionized water, 662 grams of a 50% aqueous sodium hydroxide solution, and 5 grams of sorbitol. The previously prepared Raney copper catalyst is charged into the basket which is immersed into this resulting solution and the basket is rotated in the solution for 3⅓ hours. The liquid temperature is held between the 40° and 43°C. Less than 0.2 cubic feet of hydrogen are evolved, as measured by a wet test meter.

The catalyst is subsequently tested for acrylonitrile hydration activity by the method of Example 2. The catalyst is found to have an activity which is higher than the non-additive treated catalyst of Example 2(h) which is prepared without any exposure to any additive with the sodium hydroxide.

We Claim:

1. In an improved process for preparing a Raney copper catalyst comprising from about 2 to 45 weight percent aluminum with the balance up to 100 weight percent being copper, the improvement which comprises contacting particles of a metal alloy comprised of copper and aluminum with an aqueous solution which has dissolved therein on a 100 weight percent total by-product free solution basis from greater than 0 to about 25 weight percent alkali metal hydroxide and at least one soluble aliphatic polyhydric alcohol containing at least two carbon atoms, each said alcohol having a solubility in water of at least about 5 weight percent and having a molecular weight less than about 1000, said contacting being conducted at a temperature below about 80°C.

2. The process of claim 1 wherein said polyhydric alcohol contains at least three carbon atoms per molecule and at least three hydroxyl groups per molecule which are attached to at least three different carbon atoms.

3. The process of claim 1 wherein said metal alloy is comprised of aluminum and copper in a weight ratio of from about 70:30 to 30:70 aluminum to copper in the form of particles ranging in size from about 0.001 to 0.5 inch and said aliphatic polyhydric alcohol is characterized by the formula

$$H-(CHOH)_n-H$$

where $n$ is an integer of from 4 through 8 inclusive.

4. The process of claim 2 wherein said solution comprises from greater than 0 to about 15 weight percent alkali metal hydroxide, from greater than 0 to about 5 weight percent of said aliphatic polyhydric alcohol and with the balance up to 100 weight percent thereof being water on a by-product free basis.

5. The process of claim 2 wherein said solution comprises from greater than 0 to about 5 weight percent alkali metal hydroxide, from about 0.01 to about 1.0 weight percent of said aliphatic polyhydric alcohol and with the balance up to 100 weight percent thereof being water on a by-product free basis.

6. The process of claim 1 wherein at least about 25 weight percent of the initially present aluminum in said alloy particles is removed during said contacting.

7. The process of claim 1 wherein said contacting is conducted for a time ranging from about one-half to 30 hours.

8. The process of claim 1 wherein before said contacting with said solution said alloy is preliminarily contacted with a preliminary composition which comprises an aqueous solution of at least one aliphatic polyhydric alcohol.

9. The process of claim 8 wherein said preliminary composition comprises from greater than 0 to about 25 weight percent of said aliphatic polyhydric alcohol with the balance up to 100 weight percent on a total composition basis being water.

10. The process of claim 8 wherein said preliminary composition comprises from greater than 0 to about 5 weight percent aliphatic polyhydric alcohol with the balance up to 100 weight percent on a total composition basis being water.

11. The process of claim 1 wherein said Raney copper catalyst is in the form of particles at least 90 weight percent of which range in average size from about 0.002 to 0.100 inch.

12. The process of claim 1 wherein said Raney copper catalyst is in the form of particles at least 90 weight percent of which range in average size from about 0.02 to 0.5 inch.

13. In an improved process for making a Raney copper catalyst, comprising from about 2 to 45 weight percent aluminum with the balance up to 100 weight percent being copper the improvement which comprises the step of activating a Raney copper catalyst through contact of aqueous alkali metal hydroxide with a metal alloy in particulate form comprised of copper and aluminum thereby to remove from such alloy particles at least about 25 weight percent of the aluminum initially present therein, at least a portion of such contacting being conducted over a time interval of from one-half to 30 hours using an aqueous alkali metal hydroxide solution which additionally contains dissolved therein an aliphatic polyhydric alcohol containing at least two carbon atoms per molecule, each said alcohol having a solubility in water of at least about 5 weight percent and having a molecular weight less than about 1000.

14. In an improved process for preparing a Raney copper catalyst, comprising from about 2 to 45 weight percent aluminum with the balance up to 100 weight percent being copper, the improvement which comprises the steps of:
  a. first contacting an aqueous solution of an aliphatic polyhydric alcohol containing at least two carbon atoms per molecule each said alcohol having a solubility in water of at least about 5 weight percent, with a group of metal alloy particles comprised of copper and aluminum, said alcohol having the formula:
  (1) H — (CHOH)$_n$ — H
  where $n$ is 5 or 6,
    1. said solution containing about 0.01 to 1 weight percent of said alcohol in dissolved form,
    2. said grouping having an average particle size diameter in the range of from about 0.001 to 0.5 inch,
    3. said alloy having a copper to aluminum weight ratio of from about 30:70 to 70:30,
    4. said solution having a temperature in the range from about 0°C to 80°C, and
  b. secondly adding to said solution alkali metal hydroxide as said solution contacts said particles,
    1. said solution containing greater than 0 to about 5 weight percent dissolved alkali metal hydroxide during such adding,
    2. said contacting being accomplished over a total time interval of from about one-half to 30 hours,
    3. said alkali metal hydroxide being so added gradually to said solution over said time interval,
    4. the addition rate of alkali metal hydroxide to said solution being from about 0.01 to 10 pounds alkali metal hydroxide per pound of said starting group of alloy particles per hour,
    5. the total quantity of alkali metal hydroxide so added being in the range of from about 0.5 to 25 pounds of alkali metal hydroxide per pound of said starting group of particles,
    6. the resulting aqueous medium produced in such adding each having a temperature in the range from about 0° to 80°C.

15. The process of claim 14 wherein time interval of said second contacting ranges from about 4 to 12 hours.

16. The process of claim 14 wherein said group of particles is confined to a reaction zone and said alkali metal hydroxide is so added into said reaction zone and said resulting medium is allowed to accumulate in said zone.

17. The process of claim 14 wherein said group of particles is confined to a reaction zone, and the aqueous medium resulting from such contacting and such adding is gradually removed from said zone.

18. The process of claim 17 wherein said resulting medium is so removed at a volumetric rate which is about equal to said rate of addition during said adding.

19. The process of claim 17 wherein substantially 100 weight percent of said so-removed, resulting medium is recycled back into contact with said group of particles.

20. The process of claim 17 wherein less than 100 weight percent of said so-removed, resulting medium is recycled back into contact with said group of particles.

21. The process of claim 19 wherein less than 100 weight percent of said so-removed, resulting medium is recycled back into contact with said group of particles and the balance up to 100 weight percent thereof remains removed from said reaction zone.

22. The process of claim 1 wherein said alcohol is selected from the group consisting of pentaerythritol, sorbitol and mannitol.

23. The process of claim 13 wherein said alcohol is sorbitol.

24. The process of claim 13 wherein said alcohol is mannitol.

25. The process of claim 13 wherein said alcohol is pentaerythritol.

26. The process of claim 13 wherein said alcohol is glycerol.

27. The catalyst produced by the process of claim 1.
28. A catalyst produced by the process of claim 14.
29. A catalyst produced by the process of claim 23.
30. A catalyst produced by the process of claim 24.
31. A catalyst produced by the process of claim 25.
32. A catalyst produced by the process of claim 26.

* * * * *